United States Patent [19]

Ezzell

[11] 4,152,845
[45] May 8, 1979

[54] METRIC CONVERSION BOARD

[76] Inventor: Hershel L. Ezzell, Rte. 2, Box 1924, Porter, Tex. 77365

[21] Appl. No.: 880,963

[22] Filed: Feb. 24, 1978

[51] Int. Cl.² .............................................. G09B 29/00
[52] U.S. Cl. ............................................ 35/7 R; 35/1; 73/343 R; D7/46
[58] Field of Search .................. 35/1, 7 R; 73/343 R, 73/376, 377, 378; D10/58; D7/46

[56] References Cited

U.S. PATENT DOCUMENTS

| | | | |
|---|---|---|---|
| D. 127,809 | 6/1941 | Meehan | D64/12 B |
| D. 155,660 | 10/1949 | Vernon | D10/58 X |
| D. 239,688 | 4/1976 | Doman | D7/46 |
| 540,272 | 6/1895 | Rogers | 73/343 R X |
| 797,371 | 8/1905 | Raubold | 73/343 R |
| 1,556,866 | 10/1925 | Mueller | 73/343 R |
| 2,148,806 | 2/1939 | Voll | 73/343 R X |
| 3,983,277 | 9/1976 | Ackerman | 428/46 |

OTHER PUBLICATIONS

General Electric, 1966 Diary, "Measures and Weights", on pp. 8–9.

Primary Examiner—Harland S. Skogquist
Attorney, Agent, or Firm—Daniel Jay Tick

[57] ABSTRACT

An English to metric conversion chart is provided on the face of a wooden board between a pair of spaced parallel grooves extending up and down on the board. A Fahrenheit thermometer is mounted in one of the grooves and a Celsius thermometer is mounted in the other of the grooves. A sheet of transparent plastic covers the face of the board and the grooves.

1 Claim, 2 Drawing Figures

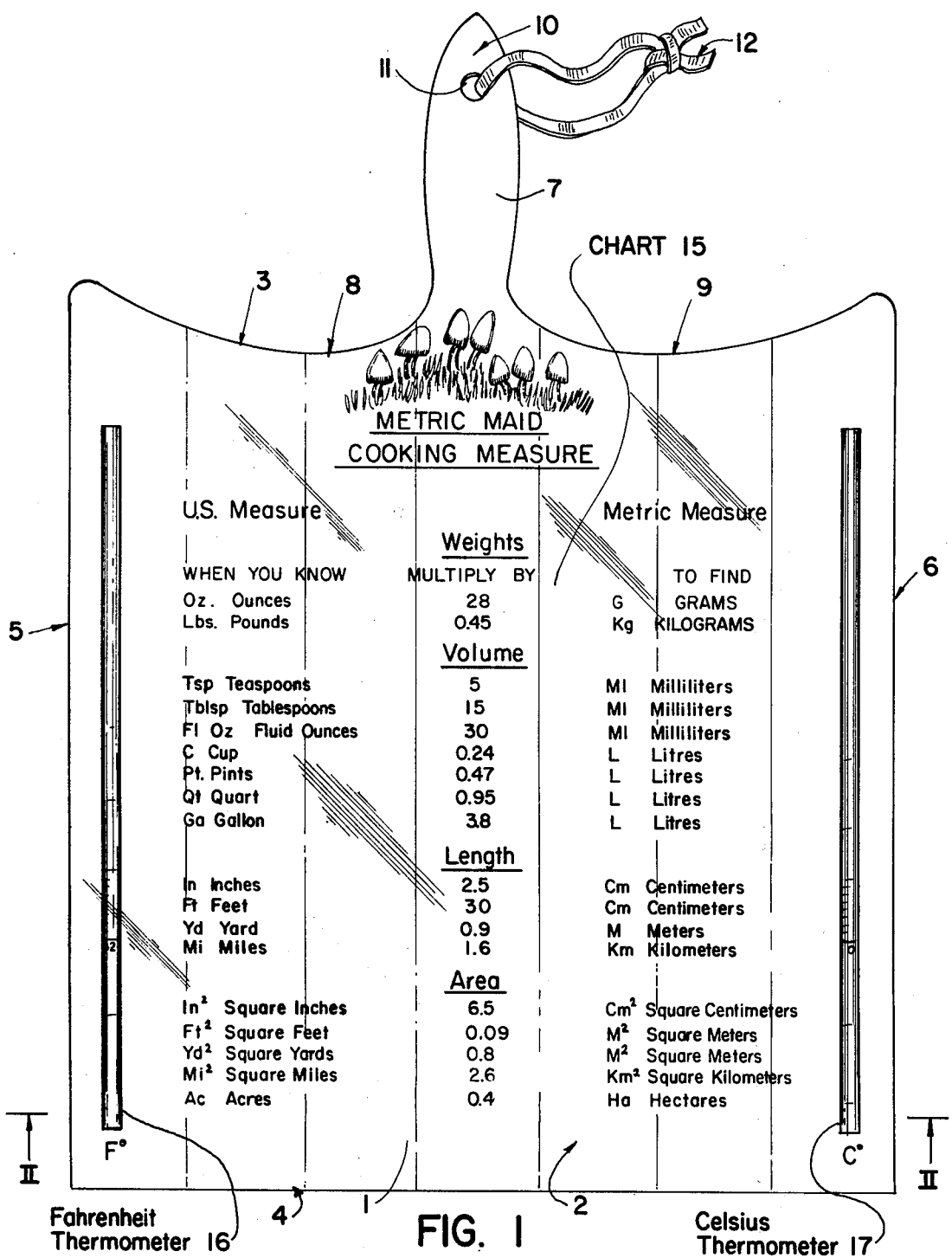
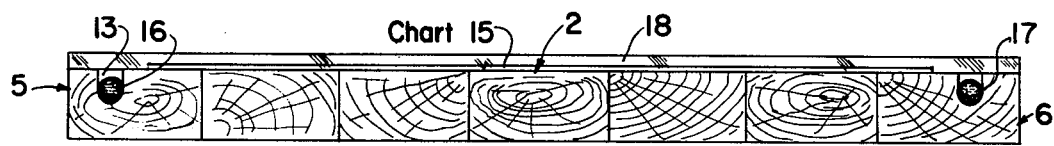
FIG. 1
FIG. 2

METRIC CONVERSION BOARD

BACKGROUND OF THE INVENTION

The present invention relates to a metric conversion board.

Metric conversion devices are disclosed in the following United States patents. U.S. Pat. No. 2,175,129, issued Oct. 3, 1939 to Rolfson, U.S. Pat. No. 2,810,362, issued Oct. 22, 1957 to Lindheim, U.S. Pat. No. 2,903,992, issued Sept. 15, 1959 to Najjar, U.S. Pat. No. 3,276,418, issued Oct. 4, 1966 to Harris, U.S. Pat. No. 3,446,178, issued May 27, 1969 to St. Clair et al and U.S. Pat. No. 3,855,958, issued Dec. 24, 1974 to Briscoe.

Objects of the invention are to provide a metric conversion board of simple structure, which is inexpensive in manufacture, attractive in appearance, and functions efficiently, effectively and reliably to provide a constant reminder and constantly educate people in the English to metric conversion of measures.

BRIEF DESCRIPTION OF THE DRAWINGS

In order that the invention may be readily carried into effect, it will now be described with reference to the accompanying drawings, wherein:

FIG. 1 is a front view of an embodiment of the metric conversion board of the invention; and FIG. 2 is a cross-sectional view, taken along the lines II—II, of FIG. 1.

DETAILED DESCRIPTION OF THE INVENTION:

The metric conversion board of the invention comprises a wooden board 1 of substantially square shape with a substantially planar face 2, a top edge 3, a bottom edge 4 substantially parallel to the top edge (FIG. 1) and a pair of spaced parallel side edges 5 and 6.

The board 1 has a projecting part 7 extending substantially vertically from the top edge 3 and coplanarly with the face 2 of the board 1, equidistantly spaced from the side edges 5 and 6 and substantially parallel thereto, as shown in FIG. 1.

The top edge 3 has a pair of arcuate indentations 8 and 9 formed therein, as shown in FIG. 1. The arcuate indentation 8 extends from the projecting part 7 to the side edge 5 and the arcuate indentation 9 extends from said projection to the side edge 6. The projecting part 7 has a free end 10 spaced from the top edge 3 and having a bore 11 formed therethrough, as shown in FIG. 1, for facilitating hanging of the board 1 on a substantially vertical supporting surface such as, for example, a wall. A loop of material 12 may be provided on the projecting part 7 by passing a shoestring type material through the bore 11 and then tying its ends together in the manner shown in FIG. 1. This facilitates hanging of the board 1 on a supporting surface.

The board 1 also has a pair of grooves 13 and 14 formed in its face 2, as shown in FIG. 2, parallel to the side edges 5 and 6, respectively (FIG. 1). The groove 13 is adjacent the side edge 5 and the groove 14 is adjacent the side edge 6.

An English to metric conversion chart 15 is provided on the face 2 of the board 1 between the grooves 13 and 14.

A Fahrenheit thermometer 16 is mounted in the groove 13.

A celsius thermometer 17 is mounted in the groove 14.

As shown in FIG. 2, a sheet of transparent plastic 18 covers the face 2 of the board 1 and the grooves 16 and 17 in the manner of a lamination, thereby providing a unit which is impervious to moisture, and the like.

While the invention has been described by means of a specific example and in a specific embodiment, I do not wish to be limited thereto, for obvious modifications will occur to those skilled in the art without departing from the spirit and scope of the invention.

I claim:

1. A metric conversion board, comprising
a wooden board of substantially square shape with a substantially planar face, a top edge, a bottom edge substantially parallel to the top edge and a pair of spaced parallel side edges, said board having a projecting part extending substantially vertically from the top edge and coplanarly with the board equidistantly spaced from the side edges and substantially parallel thereto, said top edge having a pair of arcuate indentations formed therein, each extending from the projecting part to a corresponding one of the side edges and said projecting part having a free end spaced from said top edge and having a bore formed therethrough for facilitating hanging of the board on a substantially vertical supporting surface, said board having a pair of grooves formed in its face parallel to the side edges and each adjacent corresponding ones of said side edges;
an English to metric conversion chart on the face of the board between the grooves;
a Fahrenheit thermometer mounted in one of the grooves;
a Celsius thermometer mounted in the other of the grooves; and
a sheet of transparent plastic covering the face of the board and the grooves.

* * * * *